United States Patent
Brown et al.

(10) Patent No.: US 9,667,469 B2
(45) Date of Patent: May 30, 2017

(54) COLONY APPLICATION

(71) Applicant: International Business Machines Corporation, Armonk, NY (US)

(72) Inventors: Douglas S. Brown, Charlotte, NC (US); John F. Kelley, Clarkesville, GA (US); Todd P. Seager, Orem, UT (US); Robert J. Torres, Colleyville, TX (US)

(73) Assignee: International Business Machines Corporation, Armonk, NY (US)

( * ) Notice: Subject to any disclaimer, the term of this patent is extended or adjusted under 35 U.S.C. 154(b) by 277 days.

(21) Appl. No.: 13/783,494

(22) Filed: Mar. 4, 2013

(65) Prior Publication Data

US 2014/0250179 A1 Sep. 4, 2014

(51) Int. Cl.
  *G06F 15/16* (2006.01)
  *H04L 29/06* (2006.01)
  *H04L 29/08* (2006.01)

(52) U.S. Cl.
  CPC .............. *H04L 29/06* (2013.01); *H04L 67/34* (2013.01); *H04L 69/24* (2013.01)

(58) Field of Classification Search
  CPC ........ H04B 7/02; H04W 48/08; H04W 48/16; H04W 52/48; H04W 52/50; H04W 84/18; A01N 43/78; A01N 37/50; A01N 43/36; A01N 43/653; A01N 43/88; A01N 47/32; A01N 57/12; A01N 2300/00; A01N 47/04; A01N 47/38; A01N 41/06; G06Q 10/10; H04L 29/06; H04L 67/34; H04L 69/24
  USPC .......................... 709/203–206, 208, 220–222
  See application file for complete search history.

(56) References Cited

U.S. PATENT DOCUMENTS

| | | | |
|---|---|---|---|
| 6,205,209 B1 | 3/2001 | Goldberg et al. | |
| 7,275,243 B2* | 9/2007 | Gibbons et al. | 717/159 |
| 7,640,331 B2 | 12/2009 | Batra et al. | |
| 7,996,514 B2* | 8/2011 | Baumert et al. | 709/224 |
| 2004/0019683 A1* | 1/2004 | Lee et al. | 709/227 |
| 2005/0289559 A1* | 12/2005 | Illowsky et al. | 719/318 |
| 2006/0015562 A1* | 1/2006 | Kilian-Kehr et al. | 709/206 |
| 2010/0110995 A1 | 5/2010 | Shao et al. | |
| 2010/0235523 A1 | 9/2010 | Garcia et al. | |

(Continued)

OTHER PUBLICATIONS

Disclosed Anonymously; "A method and system for developers' behavior tracking and quick assistance in collaborative application development environment"; IP.com Prior Art Database Technical Disclosure; IP.com No. IPCOM000201675D; Electronic Publication: Nov. 18, 2010; <http://priorartdatabase.com/IPCOM/000201675>.

(Continued)

*Primary Examiner* — Aftab N. Khan
*Assistant Examiner* — Anh Nguyen
(74) *Attorney, Agent, or Firm* — Lance I. Hochhauser; Nicholas L. Cadmus

(57) ABSTRACT

In a method for collaborating, a first computing device determines capabilities needed for an application to function. The first computing device enables one or more other computing devices to connect to the application. The first computing device determines capabilities of a second computing device, wherein the second computing device is connected to the application. The first computing device determines the capabilities needed for the application to function are met. The first computing device configures a user interface of the second device.

20 Claims, 6 Drawing Sheets

(56) References Cited

U.S. PATENT DOCUMENTS

2012/0054540 A1    3/2012   Howard et al.
2012/0256954 A1*   10/2012  Soon-Shiong ...... G06F 17/3087
                                                          345/633

OTHER PUBLICATIONS

IBM TDB; "Pervasive User Interface with Smart Devices, Centralized Computing and Communication"; IP.com Prior Art Database Technical Disclosure; IP.com No. IPCOM000014525D; Original Publication: Sep. 10, 2001; Electronic Publication: Jun. 19, 2003; <http://www.ip.com/pubview/IPCOM000014525D>.

Johnson, David; "A Platform for Supporting Micro-Collaborations in a Diverse Device Environment"; A Platform for Supporting Micro-Collaborations in a Diverse Device Environment; iJIM; vol. 3; Issue 4; pp. 8-16; Oct. 2009; Published Sep. 15, 2009; <http://www.i-jim.org>.

Kehoe, Michael et al.; Smarter Cities Series: A Foundation for Understanding IBM Smarter Cities; Redbooks; Redguides for Business Leaders; Copyright IBM Corp. 2011.

Mackie, Simon; "What mobile apps are essential for collaboration on the go?"; GigaOM; Printed: Oct. 2, 2012; <http://gigaom.com/2011/07/14/what-mobile-apps-are-essential-for-collaboration-on-the-go/>.

"On a Smarter Planet, we want to change the paradigm from react to anticipate"; What is a Smarter Planet?; Printed Oct. 2, 2012; <http://www.ibm.com/marterplanet/us/en/overivew/ideas/index.html?Ink=ussph2.12>.

Wikipedia; "List of Collaborative Software"; Printed: Oct. 2, 2012; <http://en.wikipedia.org/wiki/List_of_collaborative_software>.

* cited by examiner

COLONY APPLICATION

TECHNICAL FIELD

The present invention relates generally to collaborative computing applications and more specifically a collaborative computing application using a plurality of disparate computing devices.

BACKGROUND

Collaborative applications are designed to help people involved in a common task achieve goals. The design intent of collaborative applications is to transform the way documents and rich media are shared to enable more effective team collaboration. Collaborative applications provide tools that aid communication, collaboration and the process of problem solving. Additionally, collaborative applications may support project management functions, such as task assignments, time-managing deadlines, work flow, and shared calendars.

Collaborative applications should support the individuals that make up the team and the interactions between them during the group decision making process. The software may also support team membership, roles and responsibilities. Additionally, collaborative support systems may offer the ability to support ancillary systems, such as budgets and physical resources.

SUMMARY

Aspects of an embodiment of the present invention disclose a method, computer program product, and a computer system for collaborating. A first computing device determines capabilities needed for an application to function. The first computing device enables one or more other computing devices to connect to the application. The first computing device determines capabilities of a second computing device of the one or more other computing devices, wherein the second computing device is connected to the application. The first computing device determines the capabilities needed for the application to function are met. The first computing device configures a user interface of the second device.

DETAILED DESCRIPTION

Figure 1:
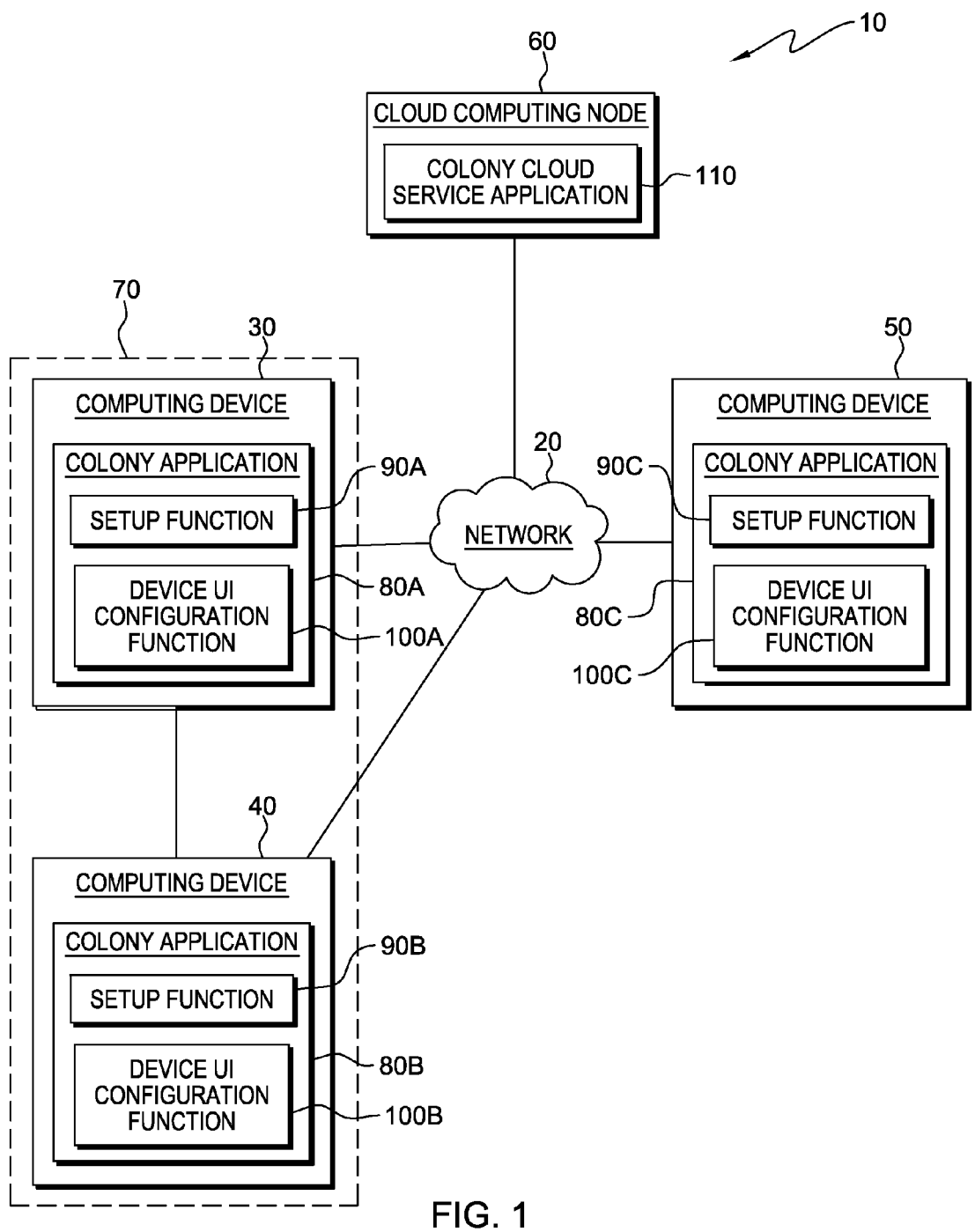
FIG. 1 depicts a diagram of a computing environment in accordance with one embodiment of the present invention.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer-readable medium(s) having computer-readable program code/instructions embodied thereon.

Any combination of computer-readable media may be utilized. Computer-readable media may be a computer-readable signal medium or a computer-readable storage medium. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of a computer-readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer-readable storage medium may be any tangible medium that can contain, or store a program for use by or in connection with an instruction execution system, apparatus, or device.

A computer-readable signal medium may include a propagated data signal with computer-readable program code embodied therein, for example, in baseband or as part of a carrier wave. Such a propagated signal may take any of a variety of forms, including, but not limited to, electro-magnetic, optical, or any suitable combination thereof. A computer-readable signal medium may be any computer-readable medium that is not a computer-readable storage medium and that can communicate, propagate, or transport a program for use by or in connection with an instruction execution system, apparatus, or device.

Program code embodied on a computer-readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on a user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer, other programmable data processing apparatus, or other devices to function in a particular manner, such that the instructions stored in the computer-readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer-implemented process such that the instructions which execute on the computer or other programmable apparatus provide processes for implementing the functions/acts specified in the flowchart and/or block diagram block or blocks.

It is understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed. A detailed description of cloud computing is given in this section to provide a better understanding of the underlying teachings discussed herein.

The present invention will now be described in detail with reference to the Figures.

FIG. 1 depicts a diagram of computing environment 10 in accordance with one embodiment of the present invention. FIG. 1 provides only an illustration of one embodiment and does not imply any limitations with regard to the environments in which different embodiments may be implemented. In another embodiment, computing environment 10 is a cloud computing environment as described in reference to FIGS. 5 and 6.

In the depicted embodiment, computing environment 10 includes computing device 30, computing device 40, computing device 50, and cloud computing node 60, interconnected over network 20. Network 20 is a wide area network (WAN) such as the Internet. In other embodiments, network 20 may be a local area network (LAN), or any combination of connections and protocols that will support communications between computing device 30, computing device 40, computing device 50, and cloud computing node 60 in accordance with embodiments of the invention. Network 20 may include wired, wireless, or fiber optic connections. Computing environment 10 may include additional computing devices, servers, or other devices not shown.

Computing device 30 is a laptop computer. In other embodiments, computing device 30 may be a desktop computer, tablet computer, smart phone or personal digital assistant (PDA). In general, computing device 30 may be any electronic device or computing system capable of sending and receiving data, and communicating with computing device 40, computing device 50, and cloud computing node 60 over network 20. Computing device 30 contains colony application 80A, setup function 90A, and device user interface (UI) configuration function 100A.

Computing device 40 is a smart phone. In other embodiments, computing device 40 may be a laptop computer, tablet computer, desktop computer or personal digital assistant (PDA). In general, computing device 40 may be any electronic device or computing system capable of sending and receiving data, and communicating with computing device 30, computing device 50, and cloud computing node 60 over network 20. Computing device 40 contains colony application 80B, setup function 90B, and device UI configuration function 100B.

Computing device 30 and computing device 40 are at location 70. Location 70 is an area where computing device 30 and computing device 40 may communicate using a computer network with a small geographic scope. Computer networks with a small geographic scope range from Near Field Communication (NFC) to Local Area Networks (LANs). A computer network with a small geographic scope typically does not have a connection to the Internet or other remote networks. In another embodiment, location 70 may be a geographic area defined by a Global Positioning System (GPS) coordinate and a radius around the GPS coordinate. In yet another embodiment, location 70 may be a geographic area defined by GPS coordinate boundaries.

In yet another embodiment, location 70 may be a location determined by a context of a device. In one embodiment, the context of a device may be a representation of the physical world around the device. This embodiment may apply to locations that may not have been predetermined using GPS or to locations too small in nature to be referenced by GPS or LAN. The context of the device may be determined based on data collected from the device. The data collected from the device may be from any sensor with an available callable API. Exemplary sensors may be an accelerometer, a gyroscope, an ambient light sensor, a microphone, a thermometer, or a camera. For example, using the data collected, the device can determine the location of the device by comparing the data collected to a database of locations with associated data points. The data points may comprise sensor data expected to be detected in certain locations.

Computing device 50 is a laptop computer. In other embodiments, computing device 50 may be a desktop computer, tablet computer, smart phone or personal digital assistant (PDA). In general, computing device 50 may be any electronic device or computing system capable of sending and receiving data, and communicating with computing device 30, computing device 40, and cloud computing node 60 over network 20. Computing device 50 contains colony application 80C, setup function 90C, and device UI configuration function 100C.

Cloud computing node 60 is a server computer. In other embodiments, cloud computing node 60 may be a management server, a web server, or any other electronic device capable of receiving and sending data. In another embodiment, cloud computing node 60 may represent a server computing system utilizing multiple computers as a server system, such as in a cloud computing environment. Cloud computing node 60 may be practiced in distributed cloud computing environments where tasks are performed by remote processing devices linked through a communications network. In a distributed cloud computing environment, programs may be located in both local and remote computer system storage devices including memory storage devices. Cloud computing node 60 contains colony cloud service application 110. Colony cloud service application 110 is a cloud service program that may facilitate the communication between colony application 80A, 80B, and 80C over network 20.

Figure 4:
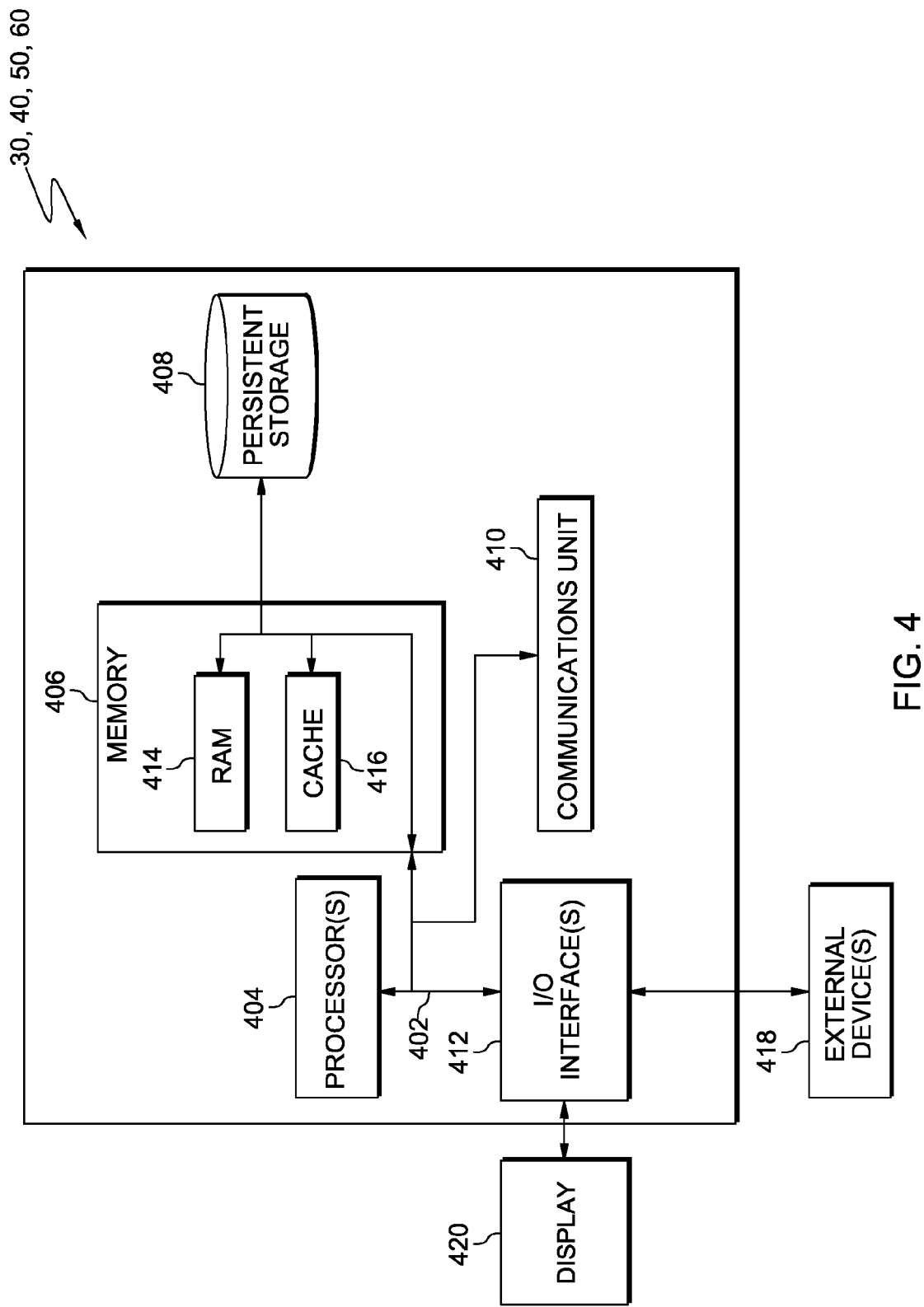
FIG. 4 depicts a block diagram of components of the computing devices and the cloud computing node of FIG. 1 in accordance with one embodiment of the present invention.

Computing device 30, computing device 40, computing device 50, and cloud computing node 60 may each include components as depicted in further detail with respect to FIG. 4.

In an example, computing environment 10 is a computing environment based around an archeological excavation. In this example, computing device 30 is laptop computer with a large display attached as an external device. The large display may be used to show the layout of the dig site. Computing device 40 is a smart phone with an integrated camera and geotagging (process of adding geographical identification metadata to various media) capabilities. The camera and geotagging capabilities may be used to photograph and locate where an object is found at the dig site. Computing device 50 is a laptop computer used by a coordinator who is offsite to monitor the dig site and any items found at the dig site.

Colony application 80A is a collaborative computing program using a plurality of computing devices. In the context of the example of computing environment 10, colony application 80A may be a custom dig site coordination application. Colony application 80A executes setup function 90A and device UI configuration function 100A. In other embodiments, the functionality of colony application 80A, setup function 90A, and device UI configuration function 100A may take place on cloud computing node 60. Colony application 80A, 80B, and 80C are different instances of the same application on different devices.

Setup function 90A operates to configure colony application 80A for operation. In one embodiment, setup function 90A determines capabilities needed for colony application 80A to function. In one embodiment, the capabilities needed for colony application 80A to function comprise device capabilities. Device capabilities may correspond to certain inputs or outputs. Device capabilities may also correspond to specific devices or device types. In the example of computing environment 10, a laptop computer with a large display attached (for output) and a smart phone with an integrated camera and geotagging capabilities (for input) are needed for colony application 80A to function. In another embodiment, the capabilities needed for colony application 80A to function may also comprise user capabilities. User capabilities may correspond to certain users that must be connected with colony application 80A. In the example of computing environment 10, a coordinator using a laptop computer to monitor the dig site is needed for colony application 80A to function.

Setup function 90A may also operate to allow other instances of colony application 80A, for example colony application 80B and 80C running on other devices, to discover colony application 80A which has already been configured for a particular use. In one embodiment, setup function 90A enables a device proximity detection function. Setup function 90A is discussed in further detail with respect to FIG. 2. Setup function 90A, 90B, and 90C operate in the same manner.

Device UI configuration function 100A operates to determine whether the capabilities needed for colony application 80A to function are met. In one embodiment, device UI configuration function 100A analyzes the device capabilities of each device running other instances of colony application 80A (e.g., colony application 80B and 80C) which are connected to colony application 80A to determine if the capabilities needed for colony application 80A to function are met. In another embodiment, device UI configuration function 100A may also analyze the user capabilities of a user using the instance of colony application 80A (e.g., colony application 80B and 80C) to determine if the capabilities needed for colony application 80A to function are met.

Device UI configuration function 100A may also operate to configure the UI's of the other instances of colony application 80A, for example colony application 80B and 80C, running on other devices. In one embodiment, a UI is configured based on the device capabilities of the device running the instance of colony application 80A (e.g., colony application 80B and 80C). The UI may also be configured based on the user capabilities of a user using the instance of colony application 80A (e.g., colony application 80B and 80C).

The UI may also be configured based on the environment of the device running the instance of colony application 80A (e.g., colony application 80B and 80C). In one embodiment, the environment of the device is a location of the device. For example, the location of the device may be the geographic location of the device. In another embodiment, the environment of the device is a context of the device. The context of the device may be determined based on data collected from the device. Device UI configuration function 100A is discussed in further detail with respect to FIG. 3. Device UI configuration function 100A, 100B, and 100C operate in the same manner.

Figure 2:
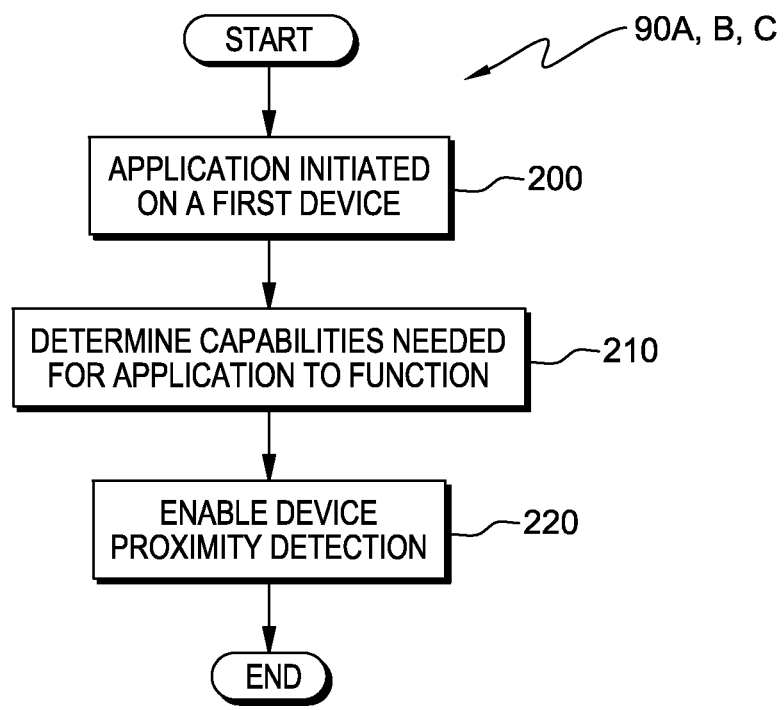
FIG. 2 depicts a flowchart of the steps of a setup function executing within the computing environment of FIG. 1, in accordance with one embodiment of the present invention.

FIG. 2 depicts a flowchart of the steps of setup function 90A executing within the computing environment of FIG. 1, for configuring colony application 80A for operation, in accordance with one embodiment of the present invention.

Initially, a user at a first computing device (computing device 30) initiates colony application 80A. In one embodiment, the user decides whether to configure colony application 80A for a particular use or to search for other instances of colony application 80A (e.g., colony application 80B and 80C) that have already been configured for operation. For example, the user may be presented with the options mentioned above. The presentation may be in the form of a popup or a menu.

If the user decides to search for other instances of colony application 80A (e.g., colony application 80B and 80C), already configured for operation, colony application 80A attempts to connect with the other instances of configured colony application 80A.

In one embodiment, colony application 80A looks for the other instances of colony application 80A connected to a common computer network with a small geographic scope (e.g., NFC or LAN). For example, if computing device 30 has Bluetooth® capabilities colony application 80A looks for other Bluetooth discoverable devices. The other discoverable devices may be running instances of colony application 80A, configured for operation. In another embodiment, colony application 80A looks for other instances of colony application 80A configured for operation connected to colony cloud service application 110. For example, if an instance of colony application 80A already configured for operation is not connected to a computer network with a small geographic scope, it will connect to colony cloud service application 110 in order to communicate with other devices.

If the user decides to configure colony application 80A for a particular use, the user will choose to initiate setup function 90A. In step 200, setup function 90A is initiated by a user at computing device 30.

In step 210, setup function 90A determines the capabilities needed for colony application 80A to function. In one embodiment, the capabilities needed for colony application 80A to function are preconfigured in the application. In another embodiment, the capabilities needed for colony application 80A to function are entered by the user. In yet another embodiment, the capabilities needed for colony application 80A to function are determined by the user with guidance from a template. The template may be a list of suggested capabilities for a particular use of colony application 80A.

For example, in the example of computing environment 10, capabilities needed for colony application 80A to function comprise a laptop computer with a large display attached (for output), a smart phone with an integrated camera and geotagging capabilities (for input), and a coordinator using a laptop computer to monitor the dig site. Setup function 90A may also determine optional capabilities to enhance the operation of colony application 80A. For example, additional smart phones with an integrated camera and geotagging capabilities (for input) may be used.

In step 220, setup function 90A enables a device proximity detection function to allow other instances of colony application 80A (e.g., colony application 80B and 80C) to connect to colony application 80A. In one embodiment, setup function 90A connects colony application 80A to a common computer network with a small geographic scope (e.g., NFC or LAN). For example, if computing device 30 has Bluetooth® capabilities, colony application 80A makes computing device 30 discoverable. In another embodiment, setup function 90A connects colony application 80A to colony cloud service application 110.

Figure 3:
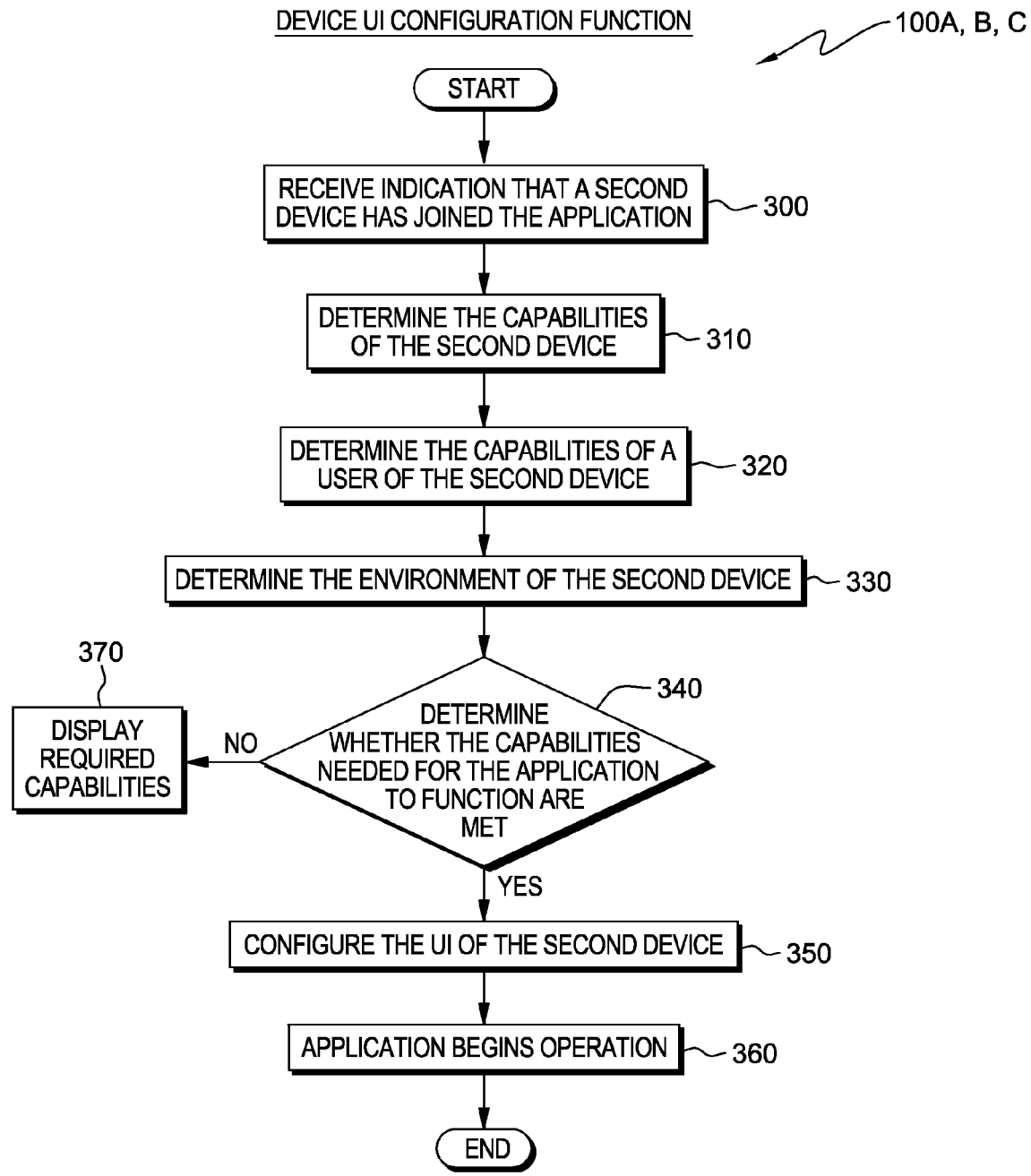
FIG. 3 depicts a flowchart of the steps of a device user interface (UI) configuration function executing within the computing system of FIG. 1, in accordance with another embodiment of the present invention.

FIG. 3 depicts a flowchart of the steps of device UI configuration function 100A executing within the computing system of FIG. 1, for determining whether the capabilities needed for colony application 80A to function are met, in accordance with one embodiment of the present invention.

Initially, a user at a second computing device (computing device 40) initiates colony application 80B. According to the process described in reference to FIG. 2, the user decides to search for other instances of colony application 80B (e.g., colony application 80A) already configured for operation. Colony application 80B connects to colony application 80A already configured for operation and running on computing device 30.

In step 300, device UI configuration function 100A receives an indication that colony application 80B running on computing device 40 has joined colony application 80A. In response to receiving the indication that colony application 80B running on computing device 40 has joined colony application 80A, device UI configuration function 100A determines the capabilities of computing device 40 (step 310). In one embodiment, device UI configuration function 100A calls colony application 80B to retrieve the capabilities of computing device 40. The capabilities of computing device 40 may be preregistered by the user using colony application 80B. The capabilities of computing device 40 may be stored on computing device 40 or on cloud computing node 60 for use by colony application 80B. For example, in the example of computing environment 10, the capabilities of computing device 40 comprise a smart phone with an integrated camera and geotagging capabilities (for input). This example has a specific device type (e.g., a smart phone) and specific inputs (e.g., camera, geotagging).

In step 320, device UI configuration function 100A determines the capabilities of the user at computing device 40. In one embodiment, device UI configuration function 100A calls colony application 80B to retrieve the capabilities of the user at computing device 40. The capabilities of the user of computing device 40 may be preregistered by the user using colony application 80B. The capabilities of the user may be stored on computing device 40 or on cloud computing node 60 for use by colony application 80B. For example, in the example of computing environment 10, the capabilities of the user of computing device 50 comprise a coordinator to monitor the dig site. This example has a specific user type (e.g., a coordinator).

In step 330, device UI configuration function 100A determines the environment of computing device 40. In one embodiment, the environment of the device is the location of the device. For example, device UI configuration function 100A calls colony application 80B to determine a location of computing device 40. Colony application 80B sends a request for the geographic location of computing device 40 to an application programming interface (API) of a GPS receiver (not shown) integrated with computing device 40. A GPS receiver can determine its location and present that location as longitude and latitude coordinates.

In another embodiment, the environment of the device may be a context of the device. The context of the device may be determined based on data collected from the device. The data collected from the device may be from any sensor with an available callable API. For example, device UI configuration function 100A may call colony application 80B to determine the context of computing device 40. Colony application 80B sends requests to the API's of all available sensors integrated with computing device 40. Exemplary sensors may be an accelerometer, a gyroscope, an ambient light sensor, a microphone, or a thermometer.

Device UI configuration function 100A determines whether the capabilities needed for colony application 80A to function are met (decision 340). In one embodiment, device UI configuration function 100A compares the capabilities needed for colony application 80A to function (created in step 210) to the capabilities of computing device 30, computing device 40, the user of computing device 30, and the user of computing device 40. The capabilities of computing device 30 and the user of computing device 30 may be preregistered for use by colony application 80A and therefore known to device UI configuration function 100A.

In the example of computing environment 10, capabilities needed for colony application 80A to function comprise a laptop computer with a large display attached (for output), a smart phone with an integrated camera and geotagging capabilities (for input), and a coordinator using a laptop computer to monitor the dig site. With only the capabilities of computing device 30, computing device 40, the user of computing device 30, and the user of computing device 40 the capabilities needed for colony application 80A to function are not met. The coordinator to monitor the dig site is still needed.

If device UI configuration function 100A determines that the capabilities needed for colony application 80A to function are met (decision 340, yes branch), device UI configuration function 100A proceeds to step 350.

In step 350, device UI configuration function 100A configures the UI of colony application 80B running on computing device 40. The UI of colony application 80B running on computing device 40 is configured based on at least the capabilities of computing device 40. The UI of colony application 80B may also be configured based on the capabilities of the user at computing device 40. The UI of colony application 80B may also be configured based on the environment of computing device 40 (determined in step 330).

In one embodiment, device UI configuration function 100A determines an appropriate UI for colony application 80B based on at least the capabilities of computing device 40. Each incidence of the colony application contains the same plurality of available UI's. Each of the plurality of available UI's may be associated with one or more device capabilities. These associations may be preregistered during the setup process of colony application 80A. Device UI configuration function 100A compares the capabilities of computing device 40 to the device capabilities associated with each of the plurality of available UI's to find a complete match. Device UI configuration function 100A causes a particular UI with one or more associated device capabilities that completely match the capabilities of computing device 40 to be displayed on computing device 40.

Each of the plurality of UI's may also be associated with one or more user capabilities or one or more device environments. The process of matching by device UI configuration function 100A functions in the same manner to find an appropriate UI for colony application 80B. For example, if the environment of the device is the location of the device an appropriate UI may be associated with a specific geographic location. Device UI configuration function 100A would compare the environment (geographic location) of computing device 40 to an environment associated with each of the plurality of available UI's to find a match.

In step 360, device UI configuration function 100A sends command to begin operation to colony application 80A. In another embodiment, after step 350 is performed colony application 80A automatically begins operation.

If device UI configuration function 100A determines the capabilities needed for colony application 80A to function are not met (decision 340, no branch), device UI configuration function 100A causes the required capabilities, still needed for colony application 80A to function, to be displayed (step 370). In one embodiment, device UI configuration function 100A sends a command to the UI of colony application 80A on computing device 30 to display a popup indicating the capabilities still needed. In another embodiment, device UI configuration function 100A causes an indication of the capabilities still needed to be displayed in the UI of colony application 80B.

Cloud Computing Description

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed, automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly release to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active consumer accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited consumer-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application-hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

FIG. 4 depicts a block diagram of components of computing device 30, computing device 40, computing device 50, and cloud computing node 60 in accordance with one embodiment of the present invention. It should be appreciated that FIG. 4 provides only an illustration of one implementation and does not imply any limitations with regard to the environments in which different embodiments may be implemented. Many modifications to the depicted environment may be made.

Computing device 30, computing device 40, computing device 50, and cloud computing node 60 each include communications fabric 402, which provides communications between computer processor(s) 404, memory 406, persistent storage 408, communications unit 410, and input/output (I/O) interface(s) 412. Communications fabric 402 can be implemented with any architecture designed for passing data and/or control information between processors (such as microprocessors, communications and network processors, etc.), system memory, peripheral devices, and any other hardware components within a system. For example, communications fabric 402 can be implemented with one or more buses.

Memory 406 and persistent storage 408 are computer-readable storage media. In one embodiment, memory 406 includes random access memory (RAM) 414 and cache memory 416. In general, memory 406 can include any suitable volatile or non-volatile computer-readable storage media.

Colony application 80A, setup function 90A, and device UI configuration function 100A are stored in persistent storage 408 of computing device 30 for execution by one or more of the respective computer processors 404 of computing device 30 via one or more memories of memory 406 of computing device 30. Colony application 80B, setup function 90B, and device UI configuration function 100B are stored in persistent storage 408 of computing device 40 for execution by one or more of the respective computer processors 404 of computing device 40 via one or more memories of memory 406 of computing device 40. Colony application 80C, setup function 90C, and device UI configuration function 100C are stored in persistent storage 408 of computing device 50 for execution by one or more of the respective computer processors 404 of computing device 50 via one or more memories of memory 406 of computing device 50. Colony cloud service application 110 is stored in persistent storage 408 of cloud computing node 60 for execution by one or more of the respective computer processors 404 of cloud computing node 60 via one or more memories of memory 406 of cloud computing node 60. In this embodiment, persistent storage 408 includes a magnetic hard disk drive. Alternatively, or in addition to a magnetic hard disk drive, persistent storage 408 can include a solid state hard drive, a semiconductor storage device, read-only memory (ROM), erasable programmable read-only memory (EPROM), flash memory, or any other computer-readable storage media that is capable of storing program instructions or digital information.

The media used by persistent storage 408 may also be removable. For example, a removable hard drive may be used for persistent storage 408. Other examples include optical and magnetic disks, thumb drives, and smart cards that are inserted into a drive for transfer onto another computer-readable storage medium that is also part of persistent storage 408.

Communications unit 410, in these examples, provides for communications with other servers, data processing systems, or devices. In these examples, communications unit 410 includes one or more network interface cards. Communications unit 410 may provide communications through the use of either or both physical and wireless communications links. Colony application 80A, setup function 90A, and device UI configuration function 100A may be downloaded to persistent storage 408 of computing device 30 through communications unit 410 of computing device 30. Colony application 80B, setup function 9BA, and device UI configuration function 100B may be downloaded to persistent storage 408 of computing device 40 through communications unit 410 of computing device 40. Colony application 80C, setup function 90C, and device UI configuration function 100C may be downloaded to persistent storage 408 of computing device 50 through communications unit 410 of computing device 50. Colony cloud service application 110 may be downloaded to persistent storage 408 of cloud computing node 60 through communications unit 410 of cloud computing node 60.

I/O interface(s) 412 allows for input and output of data with other devices that may be connected to computing system 10. For example, I/O interface 412 may provide a connection to external devices 418 such as a keyboard, keypad, a touch screen, and/or some other suitable input device. External devices 418 can also include portable computer-readable storage media such as, for example, thumb drives, portable optical or magnetic disks, and memory cards. Software and data used to practice embodiments of the present invention, e.g., colony application 80A, setup function 90A, and device UI configuration function 100A, can be stored on such portable computer-readable storage media and can be loaded onto persistent storage 408 of computing device 30 via I/O interface(s) 412 of computing device 30. Software and data used to practice embodiments of the present invention, e.g., colony application 80B, setup function 90B, and device UI configuration function 100B, can be stored on such portable computer-readable storage media and can be loaded onto persistent storage 408 of computing device 40 via I/O interface(s) 412 of computing device 40. Software and data used to practice embodiments of the present invention, e.g., colony application 80C, setup function 90C, and device UI configuration function 100C, can be stored on such portable computer-readable storage media and can be loaded onto persistent storage 408 of computing device 50 via I/O interface(s) 412 of computing device 50. Software and data used to practice embodiments of the present invention, e.g., colony cloud service application 110 can be stored on such portable computer-readable storage media and can be loaded onto persistent storage 408 of cloud computing node 60 via I/O interface(s) 412 of cloud computing node 60. I/O interface(s) 412 also connect to a display 420.

Display 420 provides a mechanism to display data to a user and may be, for example, a computer monitor or a touch screen.

Figure 5:
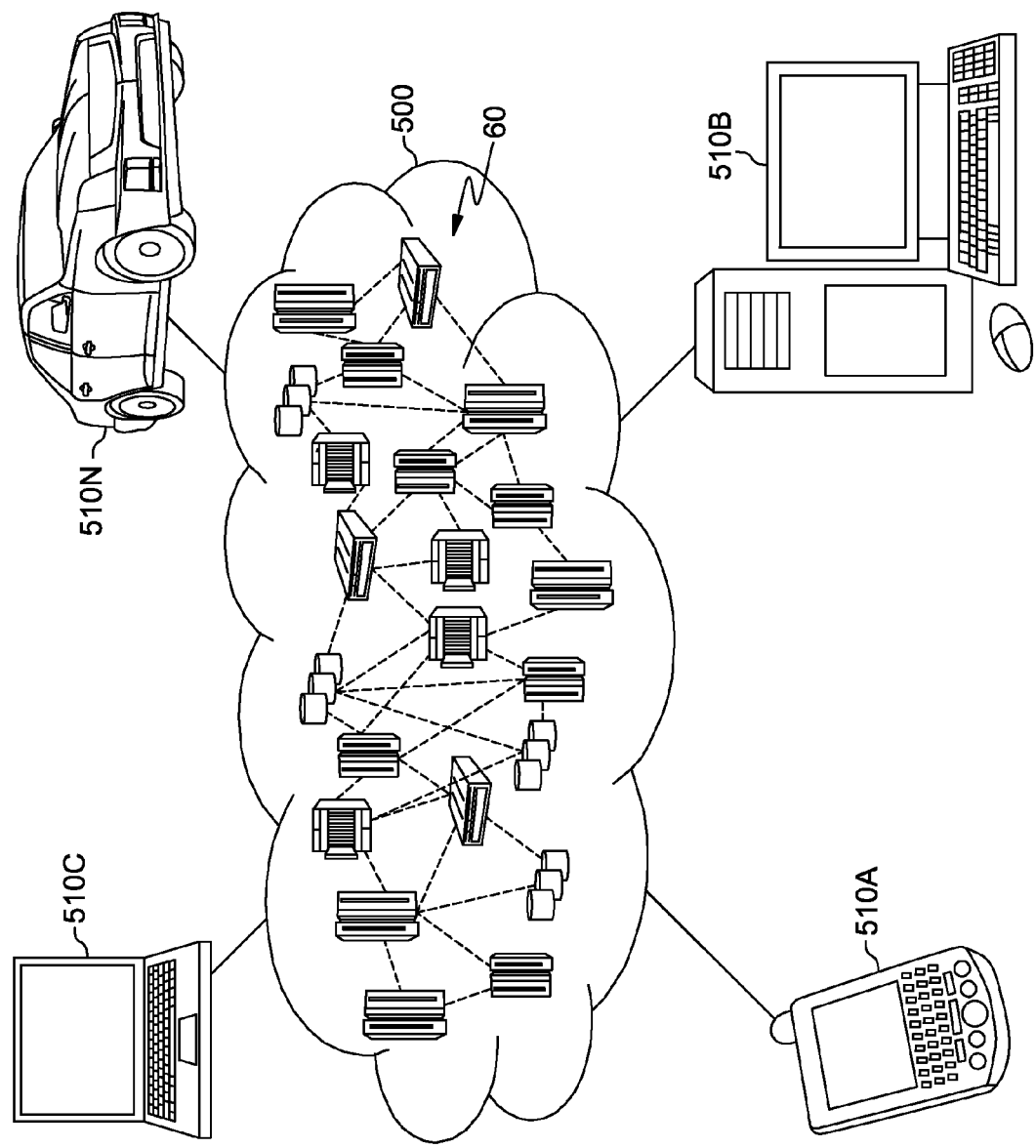
FIG. 5 depicts a cloud computing environment in accordance with one embodiment of the present invention.

FIG. 5 depicts a cloud computing environment according to an embodiment of the present invention. As shown, cloud computing environment 500 comprises one or more cloud computing nodes 60 with which local computing devices used by cloud consumers, such as, for example, personal digital assistant (PDA) or cellular telephone 510A, desktop computer 510B, laptop computer 510C, and/or automobile computer system 510N may communicate. Nodes 60 may communicate with one another. They may be grouped (not shown) physically or virtually, in one or more networks, such as private, community, public, or hybrid clouds as described hereinabove, or a combination thereof. This allows cloud computing environment 500 to offer infrastructure, platforms, and/or software as services for which a cloud consumer does not need to maintain resources on a local computing device. It is understood that the types of computing devices 510A-N shown in FIG. 5 are intended to be illustrative only and that computing nodes 60 and cloud computing environment 500 can communicate with any type of computerized device over any type of network and/or network addressable connection (e.g., using a web browser).

Figure 6:
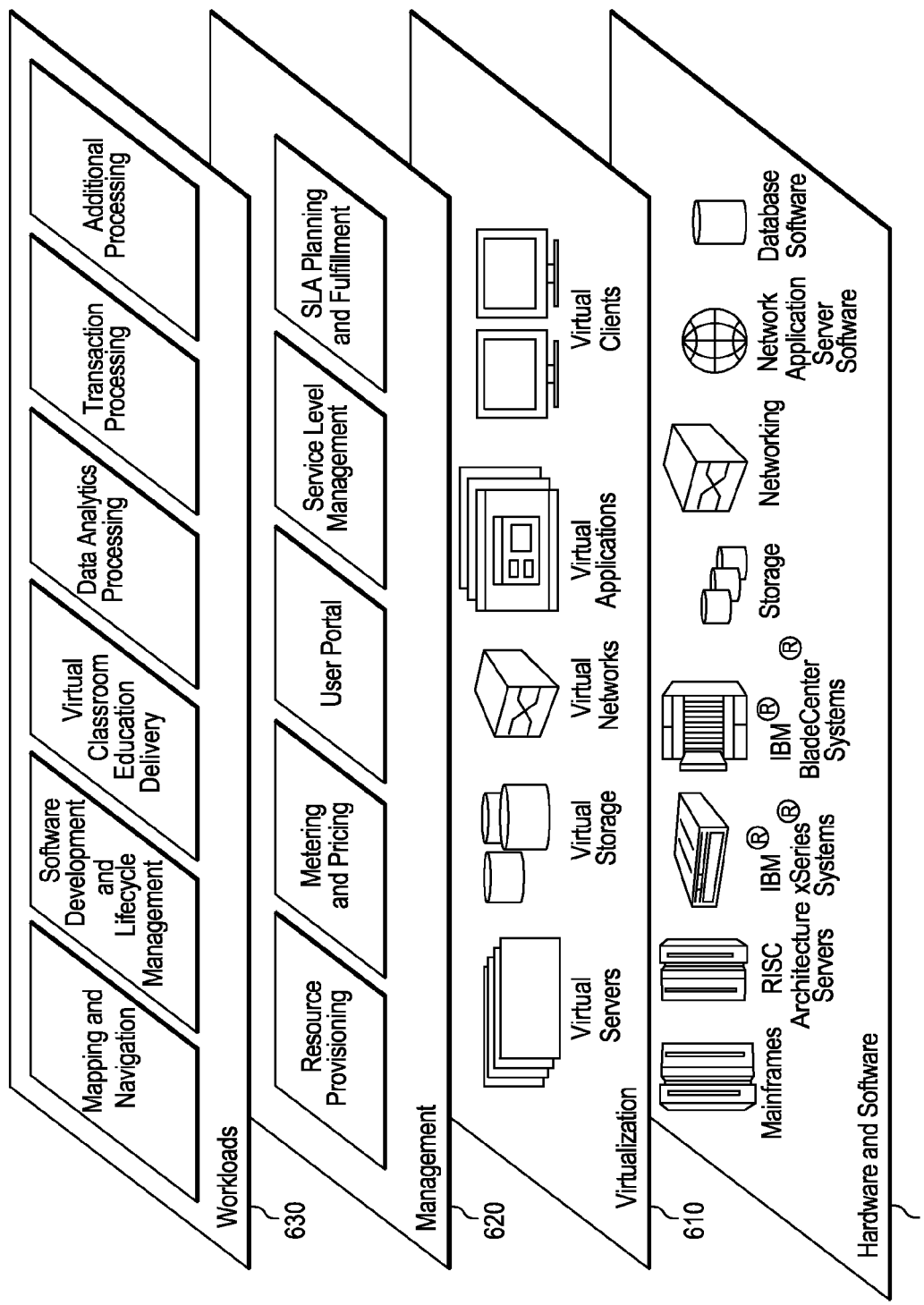
FIG. 6 depicts abstraction model layers in accordance with one embodiment of the present invention.

FIG. 6 depicts a set of functional abstraction layers provided by cloud computing environment 500 (FIG. 5) according to an embodiment of the present invention. It should be understood that the components, layers, and functions shown in FIG. 6 are intended to be illustrative only and embodiments of the invention are not limited thereto. As depicted, the following layers and corresponding functions are provided:

Hardware and software layer 600 includes hardware and software components. Examples of hardware components include mainframes. In one example, IBM® zSeries® systems and RISC (Reduced Instruction Set Computer) architecture based servers. In one example, IBM pSeries® systems, IBM System x® servers, IBM BladeCenter® systems, storage devices, networks, and networking components. Examples of software components include network application server software. In one example, IBM WebSphere® application server software and database software. In one example, IBM DB2® database software. (IBM, zSeries, pSeries, System x, BladeCenter, WebSphere, and DB2 are trademarks of International Business Machines Corporation registered in many jurisdictions worldwide.)

Virtualization layer 610 provides an abstraction layer from which the following examples of virtual entities may be provided: virtual servers; virtual storage; virtual networks, including virtual private networks; virtual applications and operating systems; and virtual clients.

In one example, management layer 620 may provide the functions described below. Resource provisioning provides dynamic procurement of computing resources and other resources that are utilized to perform tasks within the cloud computing environment. Metering and pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. Consumer portal provides access to the cloud computing environment for consumers and system administrators. Service level management provides cloud computing resource allocation and management such that required service levels are met. Service Level Agreement (SLA) planning and fulfillment provides pre-arrangement for, and procurement of, cloud computing resources for which a future requirement is anticipated in accordance with an SLA.

Workloads layer 630 provides examples of functionality for which the cloud computing environment may be utilized. Examples of workloads and functions which may be provided from this layer include: mapping and navigation; software development and lifecycle management; virtual classroom education delivery; data analytics processing; transaction processing; and additional processing. As mentioned above, all of the foregoing examples described with respect to FIG. 6 are illustrative only, and the invention is not limited to these examples.

It is understood that all functions of the present invention as described herein typically may be performed by the additional processing functionality (of workloads layer 630, which can be tangibly embodied as software and data used to practice embodiments of the present invention, e.g., colony application 80A, B, or C, setup function 90A, B, or C, and device UI configuration function 100A, B or C (FIG. 1). However, this need not be the case. Rather, the functionality recited herein could be carried out/implemented and/or enabled by any of the layers 600, 610, 620 or 630 shown in FIG. 6.

It is reiterated that although this disclosure includes a detailed description on cloud computing, implementation of the teachings recited herein are not limited to a cloud computing environment. Rather, the embodiments of the present invention are intended to be implemented with any type of networked computing environment now known or later developed.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. A method of collaborating comprising the steps of:
   a first computing device determining capabilities needed for a colony application to function, wherein the colony application is a collaborative computing program using a plurality of computing devices, and wherein the capabilities needed for a colony application to function are based, at least in part, on a template of suggested capabilities;
   the first computing device enabling one or more other computing devices to connect to the colony application via a proximity detection function;
   the first computing device receiving an indication that the one or more other computing devices has joined the colony application;
   the first computing device determining capabilities of at least one computing device of the one or more other computing devices, wherein the at least one computing device is connected to the colony application and wherein determining capabilities includes the first computing device collecting data from a sensor with an available callable application programming interface from the at least one computing device;

the first computing device determining capabilities of at least one user of the one or more other computing device, wherein the at least one user operates the at least one computing device and wherein determining capabilities includes the first computing device identifying the at least one user;

the first computing device determining an environment of each computing device of the at least one computing device, wherein the environment of each computing device includes a context that is a representation of the physical world around the at least one computing device;

the first computing device determining that the capabilities of the at least one computing device and capabilities of the first computing device together meet the capabilities needed for the colony application to function;

the first computing device determining that the capabilities of a second computing device of the at least one computing device and capabilities of the first computing device together do not meet the capabilities needed for the colony application to function;

the first computing device using a first capability of the first computing device instead of the first capability of the second computing device;

the first computing device displaying on the second computing device the capabilities needed for the colony application to function; and the first computing device configuring a user interface of each computing device of the one or more computing devices based on the capabilities of that corresponding computing device and the environment of that corresponding computing device, wherein configuring the user interface of each computing device of the one or more computing devices includes associating the user interface of each computing device of the one or more computing devices with one or more of the capabilities.

2. The method of claim 1, wherein the capabilities needed for the colony application to function comprise device capabilities.

3. The method of claim 1, wherein the capabilities needed for the colony application to function comprise user capabilities.

4. The method of claim 1, wherein the environment is a location.

5. The method of claim 1, wherein the environment is a context.

6. A computer program product for collaborating, the computer program product comprising:

one or more computer-readable storage devices and program instructions stored on at least one of the one or more storage devices, the program instructions comprising:

program instructions to determine capabilities needed for a colony application to function, wherein the colony application is a collaborative computing program using a plurality of computing devices, and wherein the capabilities needed for a colony application to function are based, at least in part, on a template of suggested capabilities;

program instructions to enable one or more other computing devices to connect to the colony application via a proximity detection function;

program instructions to receive an indication that the one or more other computing devices has joined the colony application;

program instructions to determine capabilities of at least one computing device of the one or more other computing devices, wherein the at least one computing device is connected to the colony application and wherein determining capabilities includes a first computing device collecting data from a sensor with an available callable application programming interface from the at least one computing device;

program instructions to determine capabilities of at least one user of the one or more other computing device, wherein the at least one user operates the at least one computing device and wherein determining capabilities includes the first computing device identifying the at least one user;

program instructions to determine an environment of each computing device of the at least one computing device, wherein the environment of each computing device includes a context that is a representation of the physical world around the at least one computing device;

program instructions to determine that the capabilities of the at least one computing device and capabilities of the first computing device together meet the capabilities needed for the colony application to function are met;

program instructions to determine that the capabilities of a second computing device of the at least one computing device and capabilities of the first computing device together do not meet the capabilities needed for the colony application to function;

program instructions to use a first capability of the first computing device instead of the first capability of the second computing device;

program instructions to display on the second computing device the capabilities needed for the colony application to function; and program instructions to configure a user interface of each computing device of the one or more other computing devices based on the capabilities of that corresponding computing device and the environment of that corresponding computing device, wherein configuring the user interface of each computing device of the one or more computing devices includes associating the user interface of each computing device of the one or more computing devices with one or more of the capabilities.

7. The computer program product of claim 6, wherein the capabilities needed for the colony application to function comprise device capabilities.

8. The computer program product of claim 6, wherein the capabilities needed for the colony application to function comprise user capabilities.

9. The computer program product of claim 6, wherein the environment is a location.

10. The computer program product of claim 6, wherein the environment is a context.

11. A computer system for collaborating, the computer system comprising:

one or more computer processors;

one or more computer-readable storage devices; and program instructions stored on the computer-readable storage devices for execution by at least one of the one or more processors, the program instructions comprising:

program instructions to determine capabilities needed for a colony application to function, wherein the colony application is a collaborative computing program using a plurality of computing devices, and wherein the capabilities needed for a colony application to function are based, at least in part, on a template of suggested capabilities;

program instructions to enable one or more other computing devices to connect to the colony application via a proximity detection function;

program instructions to receive an indication that the one or more other computing devices has joined the colony application;

program instructions to determine capabilities of at least one computing device of the one or more other computing devices, wherein the at least one computing device is connected to the colony application and wherein determining capabilities includes a first computing device collecting data from a sensor with an available callable application programming interface from the at least one computing device;

program instructions to determine capabilities of at least one user of the one or more other computing device, wherein the at least one user operates the at least one computing device and wherein determining capabilities includes the first computing device identifying the at least one user;

program instructions to determine an environment of each computing device of the at least one computing device, wherein the environment of each computing device includes a context that is a representation of the physical world around the at least one computing device;

program instructions to determine that the capabilities of the at least one computing device and capabilities of the first computing device together meet the capabilities needed for the colony application to function;

program instructions to determine that the capabilities of a second computing device of the at least one computing device and capabilities of the first computing device together do not meet the capabilities needed for the colony application to function;

program instructions to use a first capability of the first computing device instead of the first capability of the second computing device;

program instructions to display on the second computing device the capabilities needed for the colony application to function; and program instructions to configure a user interface of each computing device of the one or more other computing devices based on the capabilities of that corresponding computing device and the environment of that corresponding computing device, wherein configuring the user interface of each computing device of the one or more computing devices includes associating the user interface of each computing device of the one or more computing devices with one or more of the capabilities.

12. The computer system of claim 11, wherein the capabilities needed for the colony application to function comprise device capabilities.

13. The computer system of claim 11, wherein the capabilities needed for the colony application to function comprise user capabilities.

14. The computer system of claim 11, wherein the environment is a location.

15. The computer system of claim 11, wherein the environment is a context.

16. The method of claim 1, wherein the sensor is a camera.

17. The method of claim 1, wherein the capabilities needed for the colony application to function include geotagging.

18. The computer program product of claim 6, wherein the sensor is a camera.

19. The computer program product of claim 6, wherein the capabilities needed for the colony application to function include geotagging.

20. The computer system of claim 11, wherein:
the sensor is a camera; and
the capabilities needed for the colony application to function include geotagging.

* * * * *